United States Patent

[11] 3,568,624

| [72] | Inventor | Floyd E. Bjorklund |
| | | 2218 Corona Ave., Norco, Calif. 91760 |
| [21] | Appl. No. | 782,117 |
| [22] | Filed | Dec. 9, 1968 |
| [45] | Patented | Mar. 9, 1971 |

[54] VEHICLE FOR TRANSPORTING AND LAUNCHING A BOAT
14 Claims, 8 Drawing Figs.

[52] U.S. Cl. ................................ 115/1, 9/1, 280/414
[51] Int. Cl. ................................ B63f 3/00, B63c 15/00
[50] Field of Search ........................ 9/1 (TR); 180/26; 280/414; 115/1

[56] References Cited
UNITED STATES PATENTS

| 2,309,947 | 2/1943 | Gibbs et al. .................. | 115/1 |
| 2,361,951 | 11/1944 | Livermon ..................... | 9/1 |
| 2,443,480 | 6/1948 | Schwitzer et al. ............. | 180/26 |
| 2,452,938 | 11/1948 | Krake ......................... | 9/1 |
| 3,004,771 | 10/1961 | Moore ......................... | 280/414X |
| 3,370,666 | 2/1968 | Holtzclaw et al. ............. | 180/26 |

Primary Examiner—Andrew H. Farrell
Attorney—Beehler & Arant

ABSTRACT: A vehicle for transporting, launching and recovering a boat which said vehicle comprises a power-steering unit attached to a boat trailer having variable buoyancy. The power-steering unit includes a power source which is coupled to driven wheels in such a manner that the driven wheels are steerable by rotation of the power source housing. A fixed level of buoyancy is obtained by the incorporation of hollow structural members into the power-steering unit and the trailer frame. Variable buoyancy is provided by ballast tanks in association with a ballast control system so that the pressure between the boat and the launch vehicle may be varied to expedite the launch and recovery operations. Propulsion and steering control of the launch vehicle during water borne operations are provided by bladed propulsion discs attached to the driven wheels.

PATENTED MAR 9 1971 3,568,624

INVENTOR
FLOYD E. BJORKLUND
BY Beehler & Arant
ATTORNEYS.

INVENTOR.
FLOYD E. BJORKLUND
By Beehler & Grant
ATTORNEYS.

INVENTOR.
FLOYD E. BJORKLUND
By
Beehler & Grant
ATTORNEYS.

3,568,624

VEHICLE FOR TRANSPORTING AND LAUNCHING A BOAT

BACKGROUND OF THE INVENTION

This invention relates to a vehicle for the transporting, launching and recovering of boats, and particularly to a vehicle adapted for independently transporting a boat on land and for launching and recovering said boat during water borne operations.

Prior to the subject invention, the launch and recovery phases of boat handling, especially involving boats of large size and weight, have been tedious and sometimes dangerous undertakings. Heretofore the launch and recovery operations usually required the maneuvering of a boat trailer by means of a tow vehicle where the trailer is so positioned in the water as to allow the boat to be loaded or unloaded therefrom. In areas without launching ramps, or where the water, particularly in shore, is turbulent or where the beach is steep or the water deep, the loading as well as the unloading of boats by the above described method becomes especially difficult. Therefore, a vehicle which is capable of independently transporting a boat to a launching area and of becoming water borne, and having propulsion means and controlled buoyancy to assist in the launch and recovery operations would be a significant advancement in the art.

SUMMARY OF THE INVENTION

Briefly, the subject invention is a new and unique vehicle for transporting, launching and recovering boats. The launch vehicle comprises a power-steering unit which is attached to a boat trailer. The power-steering unit provides means of locomotion and of directional control both when the vehicle is operating on land and in the water. The trailer includes ballast tanks and control means therefor which allow a variable flotation level so that the relative pressure between the bottom of the boat and the trailer may be controlled during the water borne launch and recovery phases.

One object of the invention, therefore, is to provide a new and unique vehicle for transporting, launching and recovering boats.

Another object is to provide a self-contained vehicle which is capable of independently transporting a boat on land and which is adapted for independent water borne operations.

A further object is to provide a boat launching vehicle that possesses controllable buoyancy to expedite the launch and recovery phases of boat handling.

A still further objective is to provide a relatively inexpensive vehicle for transporting, launching and recovering boats which is convenient and safe to use.

BRIEF DESCRIPTION OF THE DRAWINGS

The advantages and objects of the subject invention will be more fully apparent from the following description considered in conjunction with the accompanying drawings, in which.

DESCRIPTION OF THE PREFERRED EMBODIMENT

Figure 1:
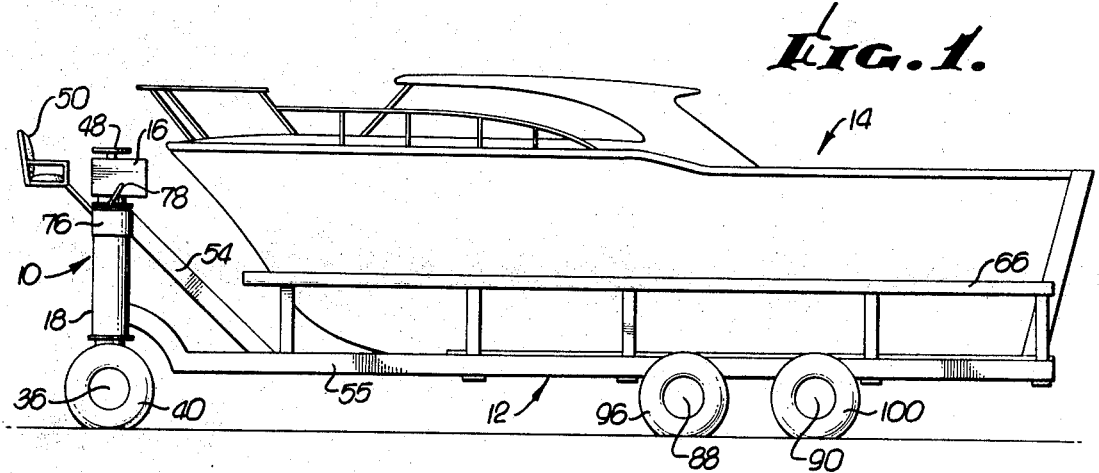
FIG. 1 is a side elevational view of a boat launcher in accordance with the subject invention, and of a boat mounted thereon, during land operation.

Referring first to FIGS. 1 through 5, the launch vehicle of the subject invention, according to one preferred embodiment thereof, comprises a power-steering unit 10 and a trailer 12 which is adapted for containing a boat 14. The power-steering unit 10 is shown in greater detail in FIGS. 4 and 5 and includes a power unit housing 16, an attachment housing 18, and a differential unit 20. The attachment housing 18 comprises a cylindrical central member 22 with a port 24 formed therein, and hollow structural members 17, 19, and 21. The upper end of the member 22 contacts a bearing (not shown) located on a base plate 26 which collars the power unit housing 16. The lower end of the member 22 rests on a bearing (not shown) mounted on a base plate 28 which collars an input port 30 of the differential unit 20. A hollow cylindrical extension portion 32 of the power unit housing 18 extends through the port 24 and is rigidly attached to the input port 30 of the differential unit 20 by means of welds, bolts, and gaskets, or other means, so as to preserve watertight integrity and structural soundness. A drive shaft 34 is mounted through the port in the extension 32 of the power unit housing 16 so as to couple a power source (not shown), contained in the power unit housing, to the differential unit 20. The power source may be an electric motor and battery arrangement, a gasoline engine or other suitable power source. The differential unit 20, which may be of conventional design, is mounted in an axle structure 36. Drive power is transmitted through the axle structure 36 to wheels 38 and 40 which are rotatably mounted on the ends of the axle.

Figure 6:
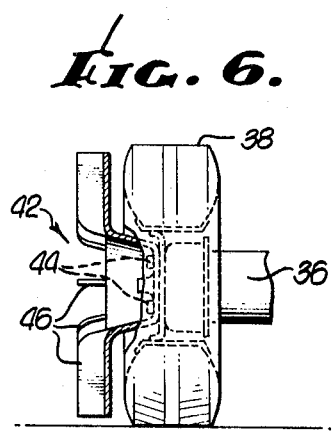
FIG. 6 is a front elevational view of one wheel and of the propulsion disc of the power-steering unit of FIG. 5.

A propulsion disc 42 (FIG. 6) is attached to each of the wheels 38 and 40 by wheel bolts 44. The propulsion disc 42 has a plurality of fins or blades 46 formed at intervals around the circumference thereof. The fins 46 provide the required force to move and control the launch vehicle of the subject invention while it is water borne.

A steering wheel 48 is attached to the power unit housing 16. Since the attachment housing 18 is rotatably coupled between the collar 26 of the power unit housing and the collar 28 of the differential unit, the power unit housing and the axle structure are free to turn relative to the attachment housing in response to torque applied to the steering wheel 48. An operator's chair 50 is rigidly attached to the attachment housing 18.

Figure 7:
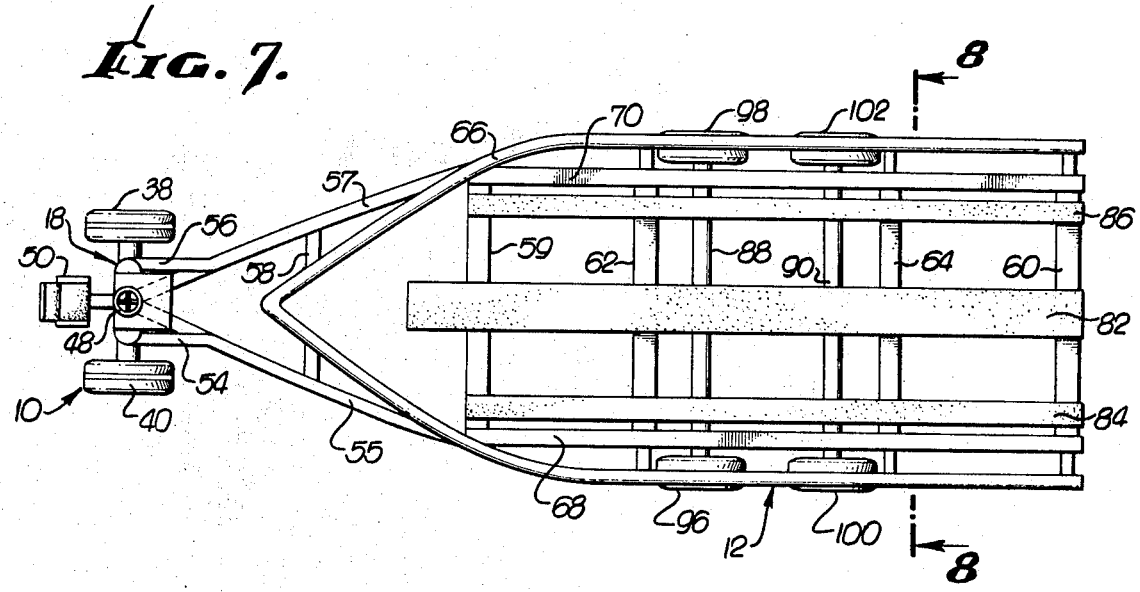
FIG. 7 is a top view of the launch vehicle of the subject invention.

The trailer 12, which may be seen best in FIG. 7, includes frame structural members such as 54 through 60. The frame members 54 through 60 consist of hollow rectangular or tubular material to provide a selected amount of fixed buoyancy to the launch vehicle of the subject invention. Also if a greater amount of flotation is desired, flotation tanks 62 and 64 may be mounted to the underside of the trailer frame. An alignment rail 66 is attached to the trailer frame by vertical attachment members and the alignment rail is constructed of padded tubing to provide safety flotation as well as serving as a guide for loading the boat 14 onto the trailer 12.

Ballast tanks 68 and 70 are constructed as an integral part of the frame structure of the trailer 12 to provide means of varying the flotation level of the launch vehicle of the subject invention. As may be seen best in FIG. 4, the ballast tank 68 is connected through a pressure fixture 72 and a pressure line 74 to a ballast control system 76. The ballast control system is mounted on the attachment housing 18 and includes a source of compressed gas (not shown). Ballast control systems are well known in the art, and in response to a control lever 78 (when in the position shown, P) the compressed gas replaces water in the ballast tanks 68 and 70 causing the launch vehicle to be more buoyant. When the control lever 78 is in the vertical position, the buoyancy of the trailer remains unchanged and when the lever is positioned to the left (V position) an inlet valve (not shown) is opened to allow more water into the tanks to lower the flotation level of the vehicle. The ballast tanks 68 and 70 may include one-way check valves (not shown) for allowing the water to exit during the pumping operation. Mechanical linkages (not shown) couple the control lever 78 to the inlet valves of the ballast tanks. The ballast tank 70 may be coupled to the ballast control system in a similar manner to that shown in FIG. 4 for the tank 68.

Figure 8:
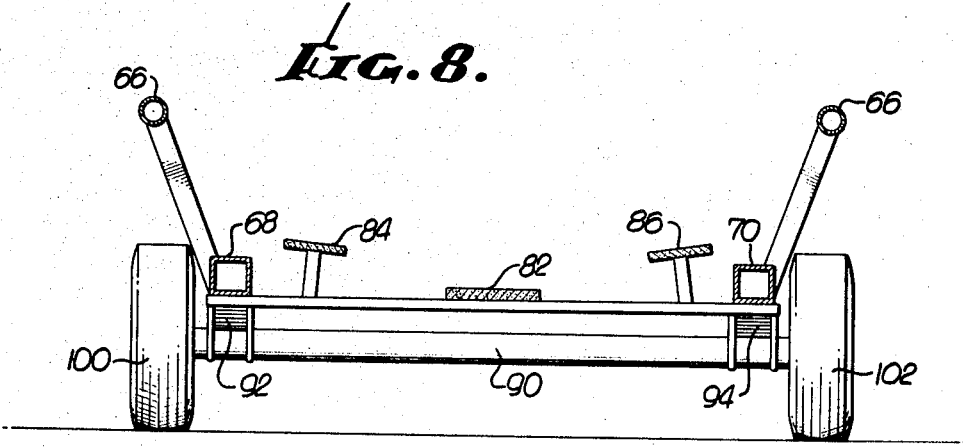
FIG. 8 is a vertical cross-sectional view taken on the line 8-8 of FIG 7.

Referring now primarily to FIGS. 7 and 8, the trailer 12 includes a keel pad 82 and left and right bottom pads 84 and 86 respectively. The frame portion of the trailer is mounted to axle structures 88 and 90 with leaf springs 92 and 94 (FIG. 8) coupled therebetween. Load bearing wheels 96, 98, and 100, 102 are rotatably mounted to the ends of axle structure 88 and 90 respectively. The front portion of the trailer 12 is attached to the power-steering unit 10 by means of welding or bolting the trailer frame members 54 through 57 to the attachment housing members 17, 19 and 21.

Figure 2:
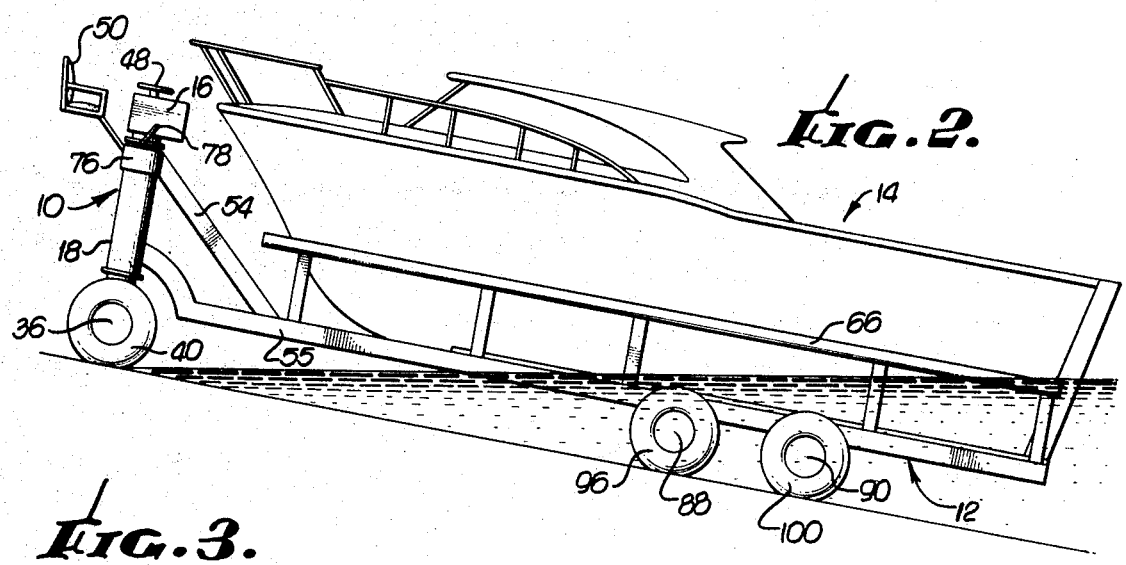
FIG. 2 is a side elevational view of the boat launcher with a boat mounted thereon in the transitional phase between land and water operation.

The land and water borne modes of operation of the launch vehicle of the subject invention will be described with reference first directed to FIGS. 1 through 3. FIG. 1 shows the launch vehicle with a boat loaded thereon during land operation such as transporting the boat to the launch area. The power source contained in the power unit housing 16 couples power by means of the drive shaft 34, the differential unit 20, and the axle structure 36 to the wheels 38 and 40. The power unit housing 16 is rigidly attached to the differential unit 20 through the member 32 so that as the power unit housing 16 is rotated in response to the steering wheel 48, the axle 36 rotates in conjunction therewith relative to the attachment housing 18. Since the attachment housing is rigidly affixed to the frame 12, rotation of the power unit housing provides an inexpensive and efficient means of providing steering control to the launch vehicle.

Figure 3:
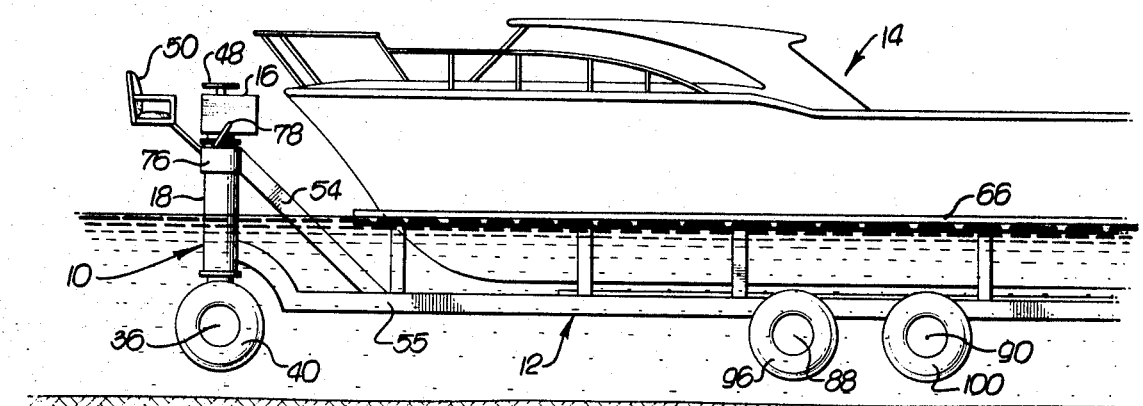
FIG. 3 is a side elevational view of the boat launcher with the boat mounted thereon in water borne operation.
Figure 4:
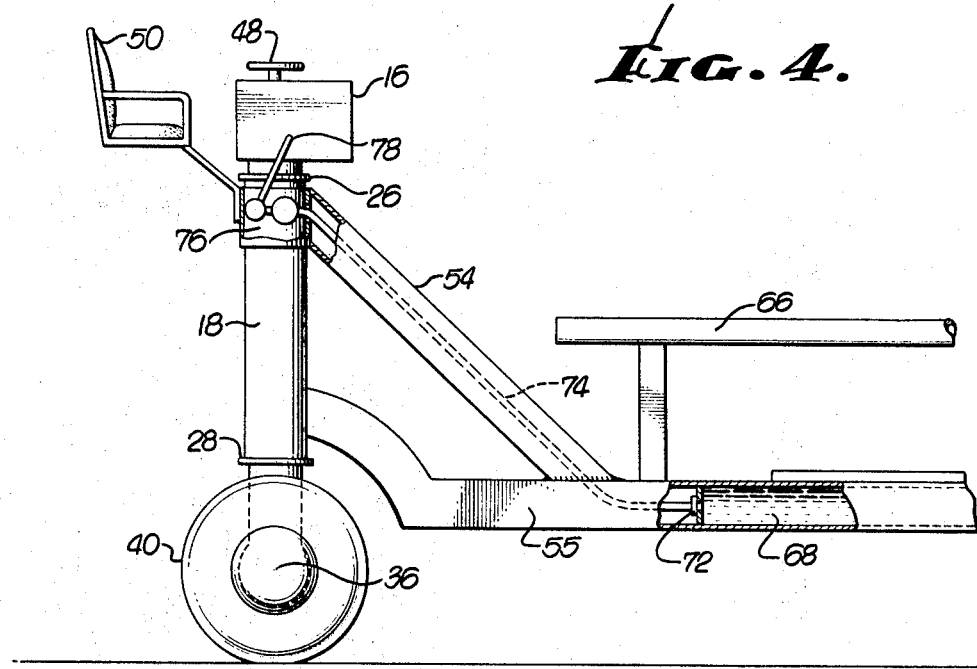
FIG. 4 is a partially cut away side elevational view of the power-steering unit and of a portion of the trailer structure of the launch vehicle in accordance with the subject invention.
Figure 5:
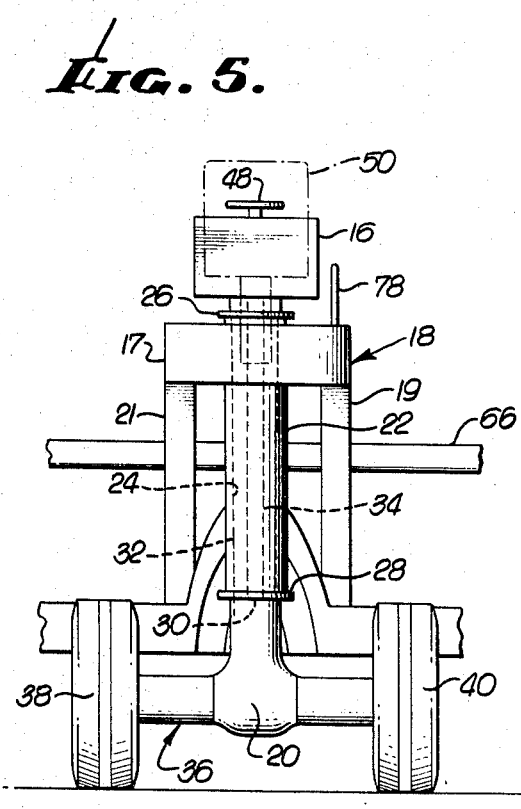
FIG. 5 is a front elevational view of the power-steering unit and of a portion of the trailer structure of the launch vehicle.

Upon reaching the launch area, the power-steering unit is maneuvered to drive the launch vehicle into the water (FIG. 2) so that the combination of the launch vehicle and the boat become water borne as shown on FIG. 3. As was explained previously, a certain amount of fixed buoyancy is provided to the launch vehicle by means of the hollow frame or tubular construction of the power-steering unit 10 and the trailer 12. Also additional fixed buoyancy is achieved by the use of the flotation tanks 62 and 64 (FIG. 7) and a safety flotation level is established by means of the alignment rail 66. While the launch vehicle is water borne, locomotion and steering control are provided by the power unit as described previously for land operation except that in water operation the final drive and steering force is provided by the fins 46 of the propulsion discs pushing against the water. Prior to the launch operation, the buoyancy of the trailer is caused to be greater than that of the boat by controlling the flotation level of the vehicle by means of the ballast tanks 68 and 70 and the ballast control system 76. Therefore, a desired amount of pressure is established between the boat bottom and the trailer pads (82, 84, 86), so as to provide greater stability and safety to the water borne operations.

When the boat has been driven to a position selected for launching, the control lever 78 is positioned to the left (V position) in order to allow water to enter the ballast tanks. Therefore the buoyancy of the launch vehicle is decreased so that the pressure between the trailer pads and the boat is decreased to allow the boat to be easily launched. It is noted that the buoyance of the flotation members is so arranged that the vehicle is more buoyant at the bow than at the stern to allow for greater ease in launching and recovering the boat.

In the recovery operation the boat and/or the vehicle are positioned with the aid of the alignment rail 66 to the proper loading position relative to the trailer pads. The control lever 78 is positioned to the right (pump position), and compressed gas replaces water in the ballast tanks 68 and 70 thereby rendering the vehicle more buoyant in order to establish sufficient pressure between the boat bottom and the launch vehicle to allow stable and safe operation.

Thus there has been described a unique apparatus for independently transporting a boat on land; and said apparatus also being capable of water borne operations for independently launching as well as recovering a boat. Although but a single preferred embodiment has been described herein, it will be obvious to those skilled in the art that numerous other embodiments and modifications within the scope of the subject invention are possible. For example, the ballast control system could be omitted and the buoyancy of the vehicle could be designed so that a fixed flotation level could be maintained. Such a fixed flotation level would be so selected as to provide sufficient pressure for launching and recovering boats of one given type. Also in applications involving larger boats, power could be coupled to all of the wheels of the vehicle and propulsion discs attached thereto for additional driving power. Further power-steering could be incorporated; and tow bar means could be attached to allow supplemental means of locomotion on land. Further, the power-steering unit could be attached to an existing trailer which is modified through the addition of air tanks, elongated solid core buoys or other flotation devices.

I claim:

1. An apparatus for transporting and launching a boat comprising:
    a first axle structure having at least one pair of wheels rotatably mounted thereto;
    a frame mounted on said first axle structure, said frame being adapted for supporting the boat;
    a power unit housing, said power unit housing containing a power source;
    a second axle structure, having at least one wheel rotatably mounted thereto;
    an attachment housing, having a port formed along the first dimension thereof, said attachment housing being rotatably mounted along said first dimension between said power unit housing and said second axle structure, said attachment housing being connected to one end of said frame;
    transmission means for coupling said power sour source through the port in said attachment housing to said wheel on said second axle structure so that said wheel is driven in response to said power source;
    connection means for connecting said power unit housing through said port in said attachment housing to said second axle structure so that as said power unit housing is rotated, said second axle structure rotates therewith;
    a second wheel rotatably mounted on said second axle structure;
    a differential unit mounted on said second axle structure for coupling said transmission means to each of said wheels of said second axle structure;
    at least one ballast tank attached to each side of said frame;
    ballast control means coupled to said ballast tanks for regulating the buoyancy of said tanks;
    a steering wheel couple to said power unit housing; and
    at least one propulsion disc attached to each of said wheels of said second axle structure for propelling said apparatus in the water, said propulsion disc having a plurality of fins for providing propulsion in water.

2. The apparatus of claim 1 further comprising a alignment rail attached adjacent to the sides of said trailer, said alignment rail being constructed of padded hollow structural tubing so as to provide a degree of buoyancy.

3. The apparatus of claim 2 wherein said ballast tanks are incorporated as structural members of said frame.

4. The apparatus of claim 3 wherein said attachment housing and said frame include hollow structural members, said hollow structural members being of such relative size that the end of the trailer coupled to the attachment housing is more buoyant than the opposite end thereof.

5. An apparatus for launching and recovering a boat comprising:
    a trailer adapted for supporting the boat;
    at least one flotation tank attached to said trailer for providing buoyancy therefor;
    flotation control means coupled to said flotation tank for regulating the buoyance thereof; and
    whereby said flotation tank in response to said control means varies the flotation level of said apparatus so that the boat may be launched and recovered while water borne.

6. The apparatus of claim 5 further comprising a alignment rail mounted on said trailer, said alignment rail being so constructed as to provide a fixed degree of buoyancy to said apparatus sufficient to support the trailer when submerged.

7. The apparatus of claim 5 wherein said trailer includes a plurality of flotation frame members, said frame members being so distributed that the apparatus is more buoyant at the bow than at the stern.

8. The apparatus of claim 5 with said flotation tanks being incorporated as side structural members of said trailer.

9. An apparatus for transporting and launching a boat comprising:
 a first axle structure having at least one pair of wheels rotatably mounted thereto;
 a frame mounted on said first axle structure, said frame being adapted for supporting the boat;
 a power unit housing, said power unit housing containing a power source;
 a second axle structure having at least one wheel rotatably mounted thereto;
 an attachment housing, having a port formed along a first dimension thereof, said attachment housing being rotatably mounted along said first dimension between said power unit housing and said second axle structure, said attachment housing being connected to one end of said frame;
 transmission means for coupling said power source through the port in said attachment housing to said wheel on said second axle structure so that said wheel is driven in response to said power source;
 connection means for connecting said power unit housing through said port in said attachment housing to said second axle structure so that as said power unit housing is rotated, said second axle structure rotates therewith;
 ballast tanks connected to said frame; and
 ballast control means coupled to said ballast tanks for regulating the buoyancy of said tanks.

10. The apparatus of claim 9 further comprising;
 propulsion means connected to said frame for propelling said apparatus in the water.

11. The apparatus of claim 10 wherein said propulsion means includes at least one propulsion disc attached to said wheel of said second axle structure, said propulsion disc having fins located at intervals along the circumference thereof.

12. An apparatus as claimed in claim 10 including a steering wheel coupled to said power unit housing, whereby in response to torque applied to said steering wheel said power unit source and said second axle structure are rotated.

13. An apparatus as claimed in claim 10 wherein said attachment housing and said frame include hollow structural members so that said apparatus is characterized by a fixed degree of buoyancy.

14. An apparatus as claimed in claim 10 including flotation tanks attached to said apparatus so that said apparatus exhibits a fixed flotation level.